(12) United States Patent
Mahmoud et al.

(10) Patent No.: US 11,980,878 B1
(45) Date of Patent: May 14, 2024

(54) METAL/POLYMER NANOCOMPOSITE PHOTOCATALYST

(71) Applicant: KING FAISAL UNIVERSITY, Al-Ahsa (SA)

(72) Inventors: Mohamed Gouda Mahmoud, Al-Ahsa (SA); Hany Mohamed Abd El-Lateef Ahmed, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/387,990

(22) Filed: Nov. 8, 2023

(51) Int. Cl.
| | | |
|---|---|---|
| *B01J 35/39* | (2024.01) | |
| *B01J 23/72* | (2006.01) | |
| *B01J 31/06* | (2006.01) | |
| *B01J 35/23* | (2024.01) | |
| *B01J 37/04* | (2006.01) | |
| *B01J 37/08* | (2006.01) | |
| *B01J 37/32* | (2006.01) | |

(52) U.S. Cl.
CPC .............. *B01J 35/39* (2024.01); *B01J 23/72* (2013.01); *B01J 31/06* (2013.01); *B01J 35/23* (2024.01); *B01J 37/04* (2013.01); *B01J 37/08* (2013.01); *B01J 37/32* (2013.01)

(58) Field of Classification Search
CPC ... B01J 35/23; B01J 23/72; B01J 31/06; B01J 37/04; B01J 37/08; B01J 37/32
See application file for complete search history.

(56) References Cited

U.S. PATENT DOCUMENTS

2012/0055873 A1    3/2012   Hoag et al.

FOREIGN PATENT DOCUMENTS

| CN | 103705600 A | * 4/2014 |
|---|---|---|
| CN | 107243647 A | 10/2017 |

OTHER PUBLICATIONS

Bambo et al., Material Today: Proceedings, (2015), v.2, p. 3921-3931.*
Rajeshkumar et al., Bioorg. Chem. and Appl., (2021), v2021, p. 1-10.*
Wang et al., J. of Envir. Chem. Engine., (2021), v.9, 105331(1-10).*
NPL-1: Wang et al., "Green Synthesis of Copper Nanoparticles Using Green Coffee Bean and Their Applications for Efficient Reduction of Organic Dyes", Journal of Environmental Chemical Engineering, olume 9, Issue 4, Aug. 2021, 105331.
NPL-2: Abdulwahab et al., "Green Synthesis of Copper Nanoparticles Mediated From Coffee Arabica Seeds Extract", Rasayan Journal of Chemistry, 16(03):1217-1228, Jan. 2023.
NPL-3: Devi et al., "Synthesis of Copper Oxide Nanoparticles by a Novel Method and Its Application in the Degradation of Methyl Orange", Advance in Electronic and Electric Engineering, vol. 4, No. 1 (2014), pp. 83-88.
NPL-4: Rajeshkumar et al., "Degradation of Toxic Dye Using Phytomediated Copper Nanoparticles and Its Free-Radical Scavenging Potential and Antimicrobial Activity Against Environmental Pathogens", Bioinorganic Chemistry and Applications, vol. 2021.

* cited by examiner

*Primary Examiner* — Yong L Chu
(74) *Attorney, Agent, or Firm* — Nath, Goldberg & Meyer; Richard C. Litman

(57) ABSTRACT

A nanocomposite photocatalyst CuNPs@PVDF including polyvinylidene fluoride (PVDF) nanoparticles loaded with copper nanoparticles (CuNps). In an embodiment, the nanocomposite photocatalyst can be effectively used to degrade industrial contaminants and dye compounds typically found in wastewater environments. The nanocomposite photocatalyst can be contacted with a solution including an organic dye under sun irradiation to achieve photochemical degradation of the organic dye.

4 Claims, 3 Drawing Sheets

METAL/POLYMER NANOCOMPOSITE PHOTOCATALYST

BACKGROUND

1. Field

The disclosure of the present patent application relates to a metal/polymer nanocomposite photocatalyst and, particularly, to a copper nanoparticle (CuNp)-loaded polyvinylidene fluoride nanoparticle (PVDF-Np) photocatalyst.

2. Description of the Related Art

Water plays a crucial role in human survival and civilization development. For example, approximately 70% of the freshwater used by humans goes to agriculture. Fishing in salt and freshwater bodies is a major source of food for many parts of the world. Much of the long-distance trade of commodities (such as oil, natural gas, and manufactured products) is transported by boats through seas, rivers, lakes, and canals. Large quantities of water, ice, and steam are used for cooling and heating, in industry and homes. Water is also an excellent solvent for a wide variety of substances both mineral and organic. Water, ice, and snow are also central to many sports and entertainment, such as swimming, pleasure boating, boat racing, surfing, sport fishing, diving, ice skating and skiing.

Although water covers approximately 70.9% of the Earth's surface, the lack of clean water is still one of the major social concerns in the world, particularly in areas that lack regular raining most of the time or that lack water purification facilities. A considerable problem is cleaning up organic dyes from highly polluted water. Current water purification and sterilization techniques generally suffer from the tedious instrumentation setup and the high costs. In view of these problems, a sustainable and ecologically acceptable method for removal of organic contaminants from contaminated water is urgently needed.

Thus, a photocatalyst nanocomposite solving the aforementioned problems are desired.

SUMMARY

The present subject matter relates to a nanocomposite photocatalyst CuNPs@PVDF including polyvinylidene fluoride (PVDF) nanoparticles loaded with copper nanoparticles (CuNps). In an embodiment, the nanocomposite photocatalyst can be effectively used to degrade industrial contaminants and dye compounds typically found in wastewater environments. The nanocomposite photocatalyst can have an increased surface area, catalytic proficiency, and be ecologically friendly. For example, the nanocomposite photocatalyst can be contacted with an organic dye under sun irradiation to achieve photochemical degradation of the organic dye. In an embodiment, the organic dye is methyl red (MR) dye.

According to an embodiment, a method of preparing a nanocomposite photocatalyst can include preparing copper nanoparticles (CuNps) by combining a copper sulfate ($CuSO_4$) solution and a green coffee ground extract, mixing polyvinylidene fluoride (PVDF) nanoparticles with a non-ionic surfactant solution to provide a polyvinylidene fluoride (PVDF) solution, adding the copper nanoparticles (CuNps) to the polyvinylidene fluoride (PVDF) solution to provide a nanocomposite; and freeze-drying the nanocomposite to provide the nanocomposite photocatalyst.

According to an embodiment, a method for photocatalytic degradation of an organic dye can include contacting a solution including an organic dye with a photocatalyst comprising polyvinylidene fluoride (PVDF) nanoparticles loaded with copper nanoparticles (CuNps) for a period of time and in the presence of sunlight.

These and other features of the present subject matter will become readily apparent upon further review of the following specification.

DETAILED DESCRIPTION OF THE PREFERRED EMBODIMENTS

Figure 1A:
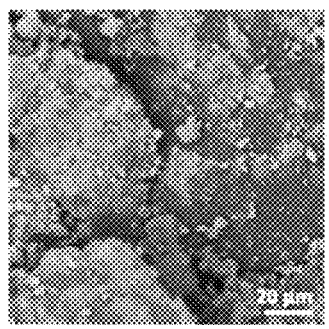
FIGS. 1A-1I are SEM images at different magnifications of (FIGS. 1A, 1B, 1C) CuNPs, (FIGS. 1D, 1E, 1F) PVDF nanoparticles, and (FIGS. 1G, 1H, 1I) CuNPs-loaded PVDF nanoparticles
Figure 1B:
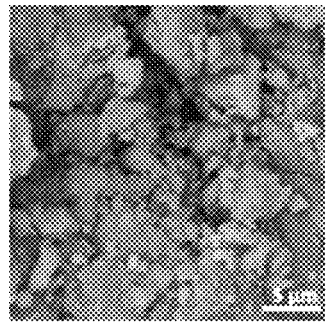
Figure 1C:
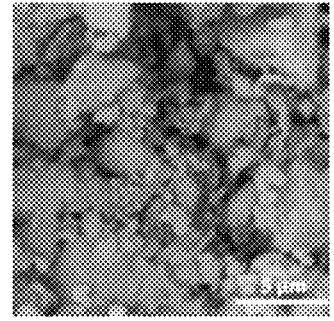
Figure 1D:
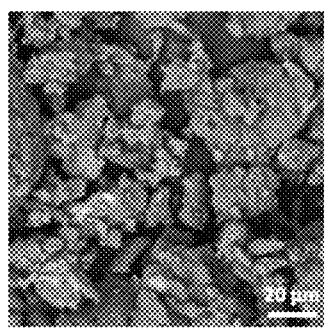
Figure 1E:
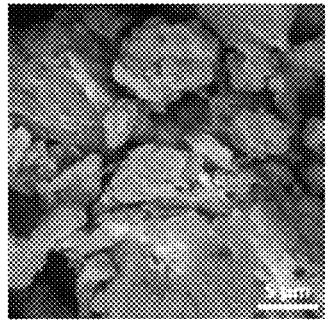
Figure 1F:
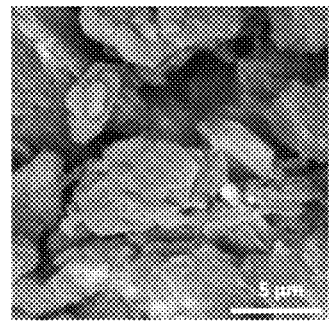
Figure 1G:
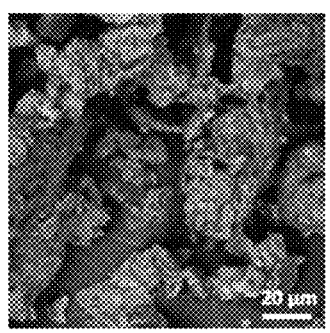
Figure 1H:
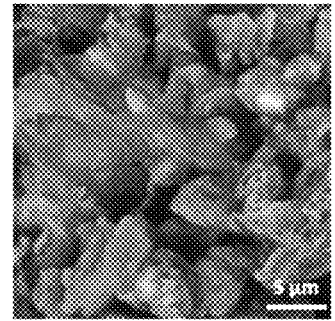
Figure 1I:
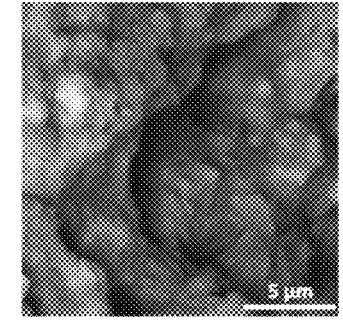

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It will be understood by those skilled in the art with respect to any chemical group containing one or more substituents that such groups are not intended to introduce any substitution or substitution patterns that are sterically impractical and/or physically non-feasible.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

As described herein, "room temperature" means a temperature of about 25° C.

The present subject matter relates to a nanocomposite photocatalyst (CuNPs@PVDF) comprising polyvinylidene fluoride (PVDF) nanoparticles loaded with copper nanoparticles (CuNps). In an embodiment, the nanocomposite photocatalyst can be effectively used to degrade industrial contaminants and dye compounds typically found in wastewater environments. The nanocomposite photocatalyst can be contacted with a solution including an organic dye under sun irradiation for photochemical degradation of the organic dye. In an embodiment, the organic dye can be methyl red (MR) dye.

In an embodiment, the copper nanoparticles (CuNPs) can be produced utilizing an efficient, eco-friendly, and economically feasible green method that utilizes a coffee grounds extract as a reducing agent. The CuNPs can be small and spherical in form. The formation of the CuNPs was verified using a variety of microscopic and spectroscopic techniques. SEM investigation confirmed the successful synthesis and dispersion of nanomaterials in a spherical shape.

The copper nanoparticles (CuNps) can be combined with polyvinylidene fluoride (PVDF) nanoparticles to form the CuNPs@PVDF nanocomposite. The CuNPs@PVDF nanocomposite's eco-friendly synthesis method and photocatalytic efficiency highlight its broad range of applications. CuNPs@PVDF, therefore, can be a good choice for treating polluted water. The nanocomposite photocatalyst can be contacted with a solution including an organic dye under sun irradiation for photochemical degradation of the organic dye. The nanocomposite photocatalyst can exhibit a high level of photocatalytic efficiency. For example, as described herein, concentrations of 50, 100, and 150 g/mL of the CuNPs@PVDF nanocomposite achieved Methyl Red (MR) dye degradation rates of 68.72%, 81.48%, and 100% after 150 min. These results support the use of the nanocomposite photocatalyst for treatment of polluted water.

In an embodiment, a method of preparing the nanocomposite photocatalyst can include preparing copper nanoparticles (CuNps) by combining a copper sulfate ($CuSO_4$) solution and a green coffee ground extract, mixing polyvinylidene fluoride (PVDF) nanoparticles with a nonionic surfactant solution to provide a polyvinylidene fluoride (PVDF) solution, adding the copper nanoparticles (CuNPs) to the polyvinylidene fluoride (PVDF) solution to provide a nanocomposite; and freeze-drying the nanocomposite to provide the nanocomposite photocatalyst. In an embodiment, the copper nanoparticles (CuNPs) can be prepared by combining the copper sulfate solution and the green coffee grounds extract in a 1:1 ratio.

In an embodiment, the copper nanoparticles can be prepared by heating the extract to a temperature ranging from about 70° C. to about 90° C., adding the copper sulfate ($CuSO_4$) solution dropwise to the heated extract to provide a mixture, and heating the mixture at a temperature ranging from about 70° C. to about 90° C. In an embodiment, the extract can be heated to a temperature of 80° C. In an embodiment, the mixture can be heated to a temperature of 80° C. In an embodiment, the polyvinylidene fluoride (PVDF) nanoparticles can be prepared by preparing a solution including polyvinylidene fluoride (PVDF), dimethyl acetamide (DMAc), and a non-ionic surfactant, freeze-drying the solution, and centrifuging the freeze-dried solution to provide the polyvinylidene fluoride (PVDF) nanoparticles. In one non-limiting embodiment, the non-ionic surfactant can be polyoxyethylene sorbitan monooleate (TWEEN 80).

In an embodiment, the green coffee grounds used to make the green coffee ground extract can be waste coffee grounds. The green coffee grounds can be desiccated in an oven, for example, by heating in an oven at a temperature of about 50° C. for about two days. The desiccated coffee grounds can be ground into a powder and then screened through a 60-mesh screen, for example. Water can then be added to powder to provide a mixture. For example, about 100 mL of water can be employed as the extraction solvent for about 10 g of the coffee ground powder. The resultant mixture can be brought to a boil for a period of time, for example, about three hours. The materials can be centrifuged for about 15 minutes at room temperature before being filtered. The resultant coffee ground extract can be stored at a temperature ranging from about 5° C. to about 10° C.

A method for photocatalytic degradation of an organic dye can include contacting the organic dye with a nanocomposite photocatalyst including polyvinylidene fluoride (PVDF) nanoparticles loaded with copper nanoparticles (CuNps) for a period of time and in the presence of sunlight, e.g., under sun irradiation. In an embodiment, the organic dye can be methyl red (MR) dye. In an embodiment, the period of time can range from about 100 minutes to about 200 minutes. In an embodiment, the period of time can be about 120 minutes.

Figure 2A:
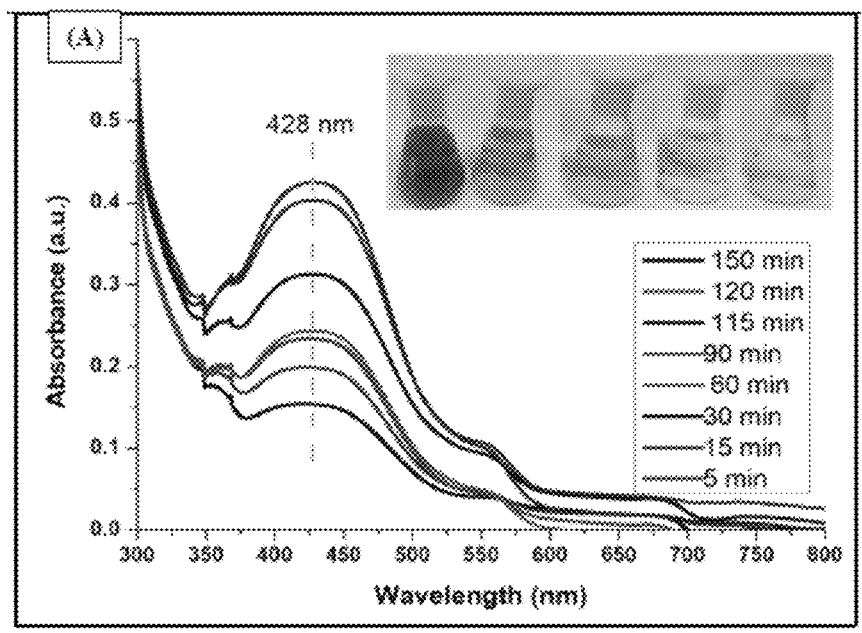
FIGS. 2A-2B are graphs showing (FIG. 2A) scan rate of time-dependent photocatalytic dye degradation of green-fabricated hybrid CuNPs@PVDF treated against MR dye, and (FIG. 2B) assessment of MR dye degradation % at different CuNPs@PVDF concentrations vs. time (min).
Figure 2B:
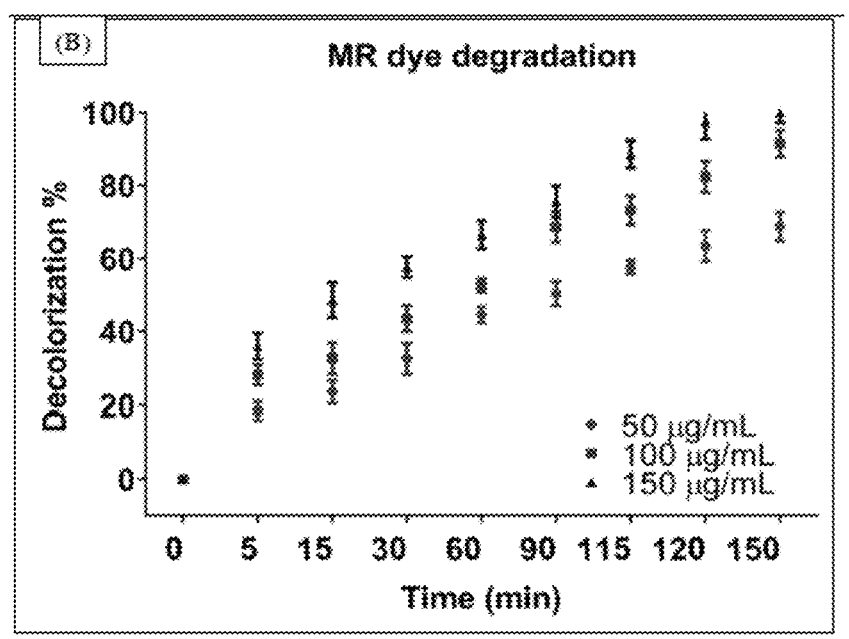

As described herein, MR dye photodegradation carried out by the nanocomposite photocatalyst under visible light illumination revealed a significant degradation efficiency. For example, the application of three different doses of CuNPs@PVDF NPs (50, 100, and 150 μg/mL) resulted in significant degradation outcomes of 68.72%, 81.48%, and 100%, respectively within a 150 min period (FIGS. 2A-2B). This observable trend reveals that increased MR dye degradation efficiency corresponded with increasing CuNPs@PVDF NPs concentrations, substantiating the concentration-dependent influence on the photocatalytic process. Overall, these results highlight the potential value of environmentally friendly CuNPs@PVDF NP as a robust photocatalyst for tackling the complex problem of degrading industrially relevant pollutants represented by MR dye, especially when operating in visible light illumination conditions.

The present teachings are illustrated by the following examples.

EXAMPLES

Example 1

Coffee Ground Extract

To achieve a neutral pH and eliminate contaminants, waste green coffee grounds were carefully weighed before being washed with deionized water at room temperature. The samples were then desiccated for two days at 50° C. in an oven to produce a consistent weight. In order to prepare the dry materials for testing, desiccated samples were first ground into a powder and then screened through a 60-mesh screen. Then, 100 mL of water, employed as the extraction solvent, was combined with 10 g dried samples to provide a mixture. The resultant mixture was then brought to a boil for about three hours. The boiled materials were centrifuged for 15 minutes at room temperature before being filtered. The filtrates or coffee ground extracts were stored at a temperature ranging from about 5° C. to about 10° C.

Example 2

Copper Nanoparticles (CuNps) Synthesis

To produce CuNps in a green manner, copper sulfate and the coffee grounds extract were combined in a 1:1 ratio. A cylindrical container was used to hold the 10 g/100 mL coffee grounds extract solution, which was heated to 80° C. and stirred magnetically at 350 rpm. Then, dropwise additions of 100 mL of $CuSO_4$ solution (0.1 M) were provided gradually to provide a mixture. After that, the mixture was heated for 10 hours at 80° C. with continual stirring. Ascorbic acid (0.01 g in 2 mL $H_2O$) was previously added to the solution to prevent the oxidation of CuNPs. Visual inspection revealed that the hue of the solution changed from blue-green to brownish-black. This result supported the use of spice extracts in the production of CuNPs. To remove debris, the solution was centrifuged for 10 minutes at a speed of 10,000 rpm. Before being subjected to a drying procedure that took place in a hot air oven for around 4-5 hours, the supernatant was first filtered. Using magnetic stirring for two minutes, 0.25 g of CuNPs were disseminated in 10 ml of deionized water for subsequent processing.

Example 3

Preparation of Polyvinylidene Fluoride (PVDF) Nanoparticles

First, 50 mL of dimethyl acetamide (DMAc) was used to dissolve 0.5 g of PVDF with vigorous stirring at room temperature. The PVDF solution was then given 0.2 g of Tween 80, and stirring was continued while using an ultrasonication probe. At room temperature, the stirring operation was carried out. In order to prevent the acetone from evaporating, the solution's ambient temperature was maintained using an ice bath. The PVDF particles were dispersed using Tween 80 as a dispersing agent. After freeze drying at −60° C. and centrifugation at 10,000 rpm, PVDF nanoparticle powder was produced. The fine powder was preserved so that SEM analyses could be used to assess the particle size and morphological structure.

Example 4

Preparation of CuNPs Loaded PVDF Nanoparticles

The fine powder of PVDF nanoparticles (0.25 g) was mixed with 0.1 g of Tween 80 in 50 mL of deionized water for 30 minutes. Then, while stirring with an ultrasonication probe, 5 mL of the previously produced CuNPs were added dropwise to the PVDF solution. With the addition of CuNPs, the hue of the PVDF solution was altered. CuNPs and PVDF nanoparticles are completely homogeneous after preparation since there is no phase separation in the finished nanocomposite. The final product, a nanocomposite fine powder including PVDF nanoparticles loaded with CuNPs, was then produced using a freeze dryer.

By examining the SEM images of the samples prepared as in FIGS. 1A-1I, it was found that the morphological structure of CuNPs (FIGS. 1A, 1B, 1C) consists of particles that are closer to spherical and have certain edges. These particles are relatively small. By comparing the morphological structure of PVDF (FIGS. 1D, 1E, 1F) with CuNPs, it was found that it has a completely different morphology than CuNPs. Also, there are no specific edges, because PVDF nanoparticles exhibits a tendency to aggregate and has the ability to combine its units with each other to form relatively large agglomerates. On the other hand, it was found that the copper loaded on PVDF nanoparticles (FIGS. 1G, 1H, 1I) has a different morphological composition and that there are deposits of CuNPs on the surface of the PVDF.

Example 5

Photocatalytic Degradation of Methyl Red Dye (MR) Using CuNPs@PVDF

Under the catalytic impact of sunlight exposure, the effectiveness of CuNPs@PVDF in degrading methyl red dye (MR) was evaluated. Various quantities (between 10 and 50 mg) of MR dye were dissolved in 1000 mL of double-distilled water to make the dye solutions and create the MR standard curve. Then, 10 mg of the CuNPs@PVDF nanocomposite photocatalyst was made using the green synthesis techniques described above and was added to a solution that included 20 mL of MR dye. Following that, the photocatalyst and solution combination was exposed to sunshine for 120 mins. 3 mL samples were taken at regular intervals and centrifuged at 10,000 rpm for 10 min. The completed product was exposed to UV-visible spectroscopy, scanning the 300-800 nm wavelength range to record the absorption peaks corresponding to the beginning and final values over predetermined intervals.

According to the equation Eq.1, the degree of decolorization was calculated as a percentage:

$$\text{Decolorization (\%)} = C_0 - C_t C_0 \times 100 \tag{Eq. 1}$$

where $C_0$ and $C_t$ are the initial and final MR dye concentrations at time, respectively.

A connection between the independent factors and the dependent variables was evaluated and the process parameters for MR decolorization using the CCD design and the Design Expert software was optimized.

Response surface methodology (RSM) is a potent tool for statistical analysis for process optimization. Several designs may be used to implement RSM, including Central Composite Design (CCD), Box-Behnken Design (BBD), one-factor design, and d-optimal design. CCD was used in this investigation to examine the effects of independent factors, such as pH, temperature, CuNPs@PVDF concentrations, exposure duration, and starting MR concentration, on the dependent variable, which was the percentage of MR decolorization. The Design Expert program (version 7.1, Stat-Ease, trial version) was used to implement the CCD design.

Based on the experiment's needs, the independent variables' range and values were established and are shown in Table 1. The CCD was used to assess the influence of the contributing components and improve the process parameters. Experimental settings were established utilizing the CCD design to evaluate the impact of various elements and improve the process parameters. Table 2 summarizes these experimental setups in detail. These conditions were created to examine the effects of different variables and achieve the intended optimization objectives.

Table 1. Experimental Range and Levels of Independent Variables Tested

TABLE 1

Experimental range and levels of independent variables tested

| Factor | Name | Units | Type | Minimum | Maximum | Coded Low | Coded High | Mean | Std. Dev. |
|---|---|---|---|---|---|---|---|---|---|
| A | pH | | Numeric | 5.00 | 9.00 | $-1 \leftrightarrow 5.00$ | $+1 \leftrightarrow 9.00$ | 7.00 | 1.19 |
| B | Temp. | C | Numeric | 10.00 | 40.00 | $-1 \leftrightarrow 10.00$ | $+1 \leftrightarrow 40.00$ | 25.00 | 8.94 |
| C | Dye Conc. | % | Numeric | 5.00 | 30.00 | $-1 \leftrightarrow 5.00$ | $+1 \leftrightarrow 30.00$ | 17.50 | 7.45 |
| D | NP Conc. | ug/mL | Numeric | 50.00 | 150.00 | $-1 \leftrightarrow 50.00$ | $+1 \leftrightarrow 150.00$ | 100.00 | 29.81 |
| E | Contact time | min. | Numeric | 0.0000 | 150.00 | $-1 \leftrightarrow 0.00$ | $+1 \leftrightarrow 15.00$ | 75 | 4.47 |

TABLE 2

Experimental design matrix with the experimental and predicted values for MR discoloration efficiency (%) using Box-Behnken Design

| Run No. | pH | Temp. (° C.) | Dye Conc. (%) | NP Conc. (µg/mL) | Contact time (min.) | Predicted Value | Actual Decolorization Value |
|---|---|---|---|---|---|---|---|
| 1 | 7 | 25 | 17.5 | 100 | 7.5 | 96.50 | 85 |
| 2 | 9 | 25 | 17.5 | 150 | 7.5 | 95.34 | 92 |
| 3 | 7 | 25 | 5 | 50 | 7.5 | 96.41 | 100 |
| 4 | 7 | 25 | 30 | 100 | 15 | 95.53 | 100 |
| 5 | 9 | 40 | 17.5 | 100 | 7.5 | 94.04 | 5.39 |
| 6 | 7 | 25 | 17.5 | 100 | 7.5 | 96.50 | 99.5 |
| 7 | 5 | 25 | 17.5 | 150 | 7.5 | 101.12 | 100 |
| 8 | 7 | 40 | 17.5 | 100 | 15 | 97.21 | 100 |
| 9 | 7 | 40 | 17.5 | 100 | 0 | -0.4146 | 0 |
| 10 | 5 | 25 | 17.5 | 50 | 7.5 | 86.35 | 93.8 |
| 11 | 5 | 25 | 5 | 100 | 7.5 | 101.22 | 100 |
| 12 | 7 | 10 | 17.5 | 150 | 7.5 | 98.36 | 100 |
| 13 | 7 | 10 | 17.5 | 50 | 7.5 | 85.38 | 72.2 |
| 14 | 5 | 25 | 30 | 100 | 7.5 | 94.22 | 89.5 |
| 15 | 7 | 40 | 17.5 | 50 | 7.5 | 86.79 | 76.3 |
| 16 | 7 | 25 | 5 | 150 | 7.5 | 96.99 | 100 |
| 17 | 7 | 40 | 17.5 | 150 | 7.5 | 95.67 | 100 |
| 18 | 7 | 25 | 17.5 | 150 | 15 | 103.21 | 100 |
| 19 | 7 | 25 | 30 | 150 | 7.5 | 100.19 | 99.2 |
| 20 | 7 | 25 | 17.5 | 100 | 7.5 | 96.50 | 100 |
| 21 | 7 | 25 | 5 | 100 | 0 | 5.05 | 0 |
| 22 | 7 | 10 | 5 | 100 | 7.5 | 99.63 | 100 |
| 23 | 9 | 25 | 30 | 100 | 7.5 | 92.13 | 89.2 |
| 24 | 9 | 25 | 5 | 100 | 7.5 | 99.43 | 100 |
| 25 | 9 | 10 | 17.5 | 100 | 7.5 | 94.38 | 100 |
| 26 | 9 | 25 | 17.5 | 50 | 7.5 | 88.26 | 93.5 |
| 27 | 7 | 25 | 17.5 | 100 | 7.5 | 96.50 | 100 |
| 28 | 7 | 25 | 30 | 100 | 0 | -2.10 | 0 |
| 29 | 9 | 25 | 17.5 | 100 | 0 | 2.28 | 0 |
| 30 | 5 | 10 | 17.5 | 100 | 7.5 | 96.61 | 99.5 |
| 31 | 5 | 40 | 17.5 | 100 | 7.5 | 95.68 | 94.2 |
| 32 | 7 | 40 | 30 | 100 | 7.5 | 91.84 | 93.6 |
| 33 | 7 | 40 | 5 | 100 | 7.5 | 98.59 | 100 |
| 34 | 7 | 25 | 30 | 50 | 7.5 | 78.91 | 78.5 |
| 35 | 5 | 25 | 17.5 | 100 | 0 | -0.0354 | 0 |
| 36 | 5 | 25 | 17.5 | 100 | 15 | 101.84 | 100 |
| 37 | 7 | 25 | 5 | 100 | 15 | 102.68 | 100 |
| 38 | 7 | 25 | 17.5 | 100 | 7.5 | 96.50 | 94.5 |
| 39 | 7 | 25 | 17.5 | 50 | 15 | 87.03 | 89.5 |
| 40 | 7 | 10 | 17.5 | 100 | 0 | 0.2229 | 0 |
| 41 | 7 | 10 | 30 | 100 | 7.5 | 92.08 | 92.8 |
| 42 | 7 | 25 | 17.5 | 100 | 7.5 | 96.50 | 100 |

Figure 3:
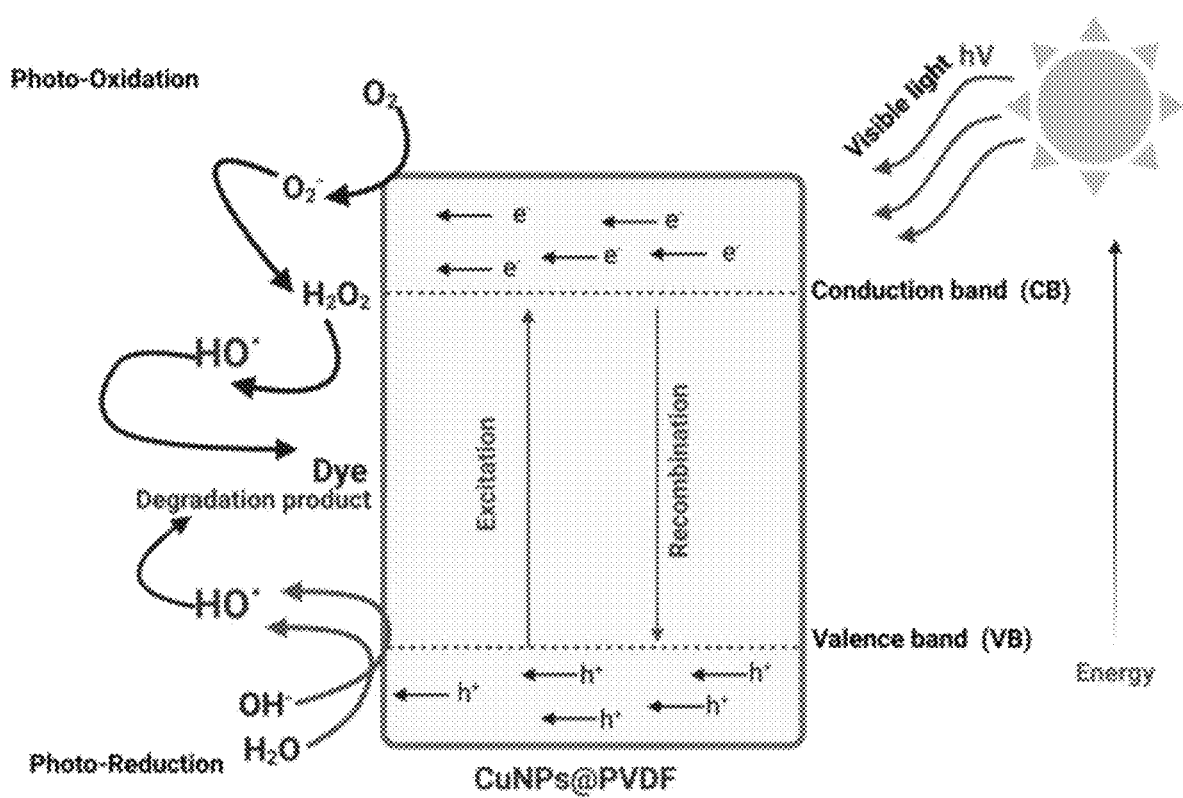
FIG. 3 is a schematic representation of photocatalytic degradation of dyes.

FIG. 3 depicts the proposed mechanism for the photocatalytic degradation of textile dyes with the stimulation of sunlight. Likewise, CuNPs can be used to reveal a possible mechanism for the complex photocatalytic activity behind the breakdown of MR dye. The process starts when the CuNPs absorb photons from the incident visible light. The production of electron-hole pairs (e--h+) is caused by the promotion of electrons from the valence band (VB) to the conduction band (CB) as a result of this energy influx. The created positive holes (h+) act as strong oxidizing agents within the valence band. The highly reactive hydroxyl radicals (OH) are created when these positive holes interact with water molecules or hydroxyl ions (OH—) in the nearby aqueous environment. The hydroxyl radicals (OH) produced in this way are incredibly reactive and strongly tend to damage the organic molecules that make up the MR dye. The hydroxyl radicals start a sequence of radical-mediated events involving hydrogen abstraction, electron transfer, and fragmentation activities. The ferocious contacts between the hydroxyl radicals and the molecules of MR dye break chemical bonds within the dye's molecular structure. The dye molecules eventually split up into more manageable chunks as a result of this process.

Further cleavage and fragmentation of the dye molecules finally break down the initially complex organic compounds into simpler intermediates that are more water-soluble. Following further breakdown and mineralization of these intermediates, the MR dye molecules are finally transformed into safe, eco-friendly end products like carbon dioxide, water, and tiny inorganic ions. The active role of the CuNPs catalyst is maintained throughout this complex process. After aiding in the MR dye molecule breakdown, the electron-hole pairs are rejoined, the catalyst is regenerated, and it is then usable for other photocatalytic cycles.

A comprehensive examination of interacting effects was conducted to acquire further insight into the complex interplay between the process factors driving the advanced dye degradation process. This investigation was made more accessible by visualizing 3D surface curves and 2D figures, where two independent variables were placed next to one another while keeping the other variables at their zero (center) level. The depiction of reaction, measured as the percentage of decolorization attained, was successfully accomplished using these distinctive graphical representations. pH plays a crucial part as a deciding factor that dramatically affects the photodegradation of MR dye. The complex interaction between the pH values inherent to the solution and the dominant functional groups in CuNPs@PVDF significantly influences surface charge dynamics. This thus has an impact on the MR dye's photodegradation process. It was determined that an appropriate pH of 5 would result in total decolorization, outlining its critical function in directing the effectiveness of the advanced degradation process. A remarkable accomplishment of 100% decolorization was accomplished thanks to the interaction of several other crucial factors, including temperature (25° C.), dye concentration (17.5 mg/L), time duration (75 min), and NPs concentration (150 µg/mL). This noteworthy result confirms the intricate harmony between various process variables in achieving the desired result.

The dye solution undergoes a catalytic reaction on the nanoparticle surface. The effectiveness of the dye degradation catalyst is simultaneously improved by increasing the surface area of nanomaterials. Intriguingly, it has been shown that shrinking the size of the catalyst improves catalytic processes. Under the influence of sunshine, the transfer of electrons from the valence band to the conduction band is enhanced in the case of biosynthesized CuNPs. The thorough decolorization that was accomplished in the presence of light indicates that a photocatalytic mechanism clearly controls the degradation process. Apparently, methyl red (MR) degrades much more quickly than methyl orange and Erichrome black T. This difference could be explained by the sulfate group in MR playing a facilitative function in the photocatalytic breakdown process.

It is to be understood that the nanocomposite photocatalyst is not limited to the specific embodiments described above but encompass any and all embodiments within the scope of the generic language of the following claims enabled by the embodiments described herein, or otherwise shown in the drawings or described above in terms sufficient to enable one of ordinary skill in the art to make and use the claimed subject matter.

We claim:
1. A method of preparing a nanocomposite photocatalyst, comprising:
   preparing copper nanoparticles (CuNps) using a copper sulfate (CuSO4) solution and a green coffee ground extract;
   mixing polyvinylidene fluoride (PVDF) nanoparticles with a nonionic surfactant solution to provide a polyvinylidene fluoride (PVDF) solution;
   adding the copper nanoparticles (CuNPs) to the polyvinylidene fluoride (PVDF) solution to provide a nanocomposite; and
   freeze-drying the nanocomposite to provide the nanocomposite photocatalyst;
wherein the green coffee ground extract is prepared by a method comprising:
   desiccating coffee grounds in an oven at about 50° C. for about two days to obtain desiccated coffee grounds;
   grinding the desiccated coffee grounds to a powder and screening the powder through a 60-mesh screen to obtained screened powder; and
   extracting 10 g of the screened powder by adding 100 ml water and boiling the resulting solution for about three hours, followed by centrifuging and filtering the solution to obtain the coffee ground extract.

2. The method of claim 1, wherein the copper nanoparticles (CuNPs) are prepared by combining the copper sulfate solution at 0.1M concentration and the green coffee grounds extract in a 1:1 ratio by volume.

3. The method of claim 2, wherein the copper nanoparticles are prepared by heating the green coffee grounds extract to a temperature ranging from about 70° C. to about 90° C., adding the copper sulfate (CuSO4) solution dropwise to the heated green coffee grounds extract to provide a mixture, and heating the mixture at a temperature ranging from about 70° C. to about 90° C.

4. The method of claim 1, wherein the polyvinylidene fluoride (PVDF) nanoparticles are prepared by preparing a solution including polyvinylidene fluoride (PVDF), dimethyl acetamide (DMAc) and a non-ionic surfactant, freeze-drying the solution, and centrifuging the freeze-dried solution to provide the polyvinylidene fluoride (PVDF) nanoparticles.

* * * * *